United States Patent

[11] 3,603,148

[72] Inventor Sotakazu Rikuta
148 Koun-cho, Gunma-ken, Maebashi-shi, Japan
[21] Appl. No. 860,232
[22] Filed Sept. 23, 1969
[45] Patented Sept. 7, 1971
[32] Priority Oct. 18, 1968
[33] Japan
[31] 43/90903

[54] FLOW METER OF THE AREA TYPE
5 Claims, 4 Drawing Figs.

[52] U.S. Cl. .................................................. 73/209, 73/205, 73/420
[51] Int. Cl. .................................................. G01p 5/14, G01p 5/02
[50] Field of Search ...................................... 73/205, 207, 209–213, 272, 401, 420

[56] References Cited
UNITED STATES PATENTS

| | | | |
|---|---|---|---|
| 1,492,939 | 5/1924 | Royer | 73/212 |
| 1,858,399 | 5/1932 | Jones | 73/205 |
| 1,989,366 | 1/1935 | Jones | 73/209 |
| 2,023,008 | 12/1935 | Deming | 73/209 |
| 2,989,123 | 6/1961 | Holmes | 73/209 X |

Primary Examiner—Richard C. Queisser
Assistant Examiner—C. E. Snee, III
Attorney—Wenderoth, Lind & Ponack ABSTRACT: A flowmeter of the area-type having a connecting pipe member for connecting the meter to a main line through which a fluid to be measured flows. The connecting pipe member is formed with an orifice disc or plate so that a bypassing flow of the fluid is produced by a pressure differential in the fluid flow between the upstream side and the downstream side of the orifice, which flow takes place by way of bypassing inlet and outlet ports provided respectively on the upstream and downstream sides of said orifice and within a meter-mounting collar formed on the connecting pipe. The inlet and outlet ports are operatively connected with a flowmeter having a mounting base cooperable with sad mounting collar, and provided with separate feed and return passageways in the base, and with a feed-receiving float line and a return line adjacent thereto, so that a common communication pipe line thereof has one end which is connected with either the inlet or outlet passageway, and the separate passageways in said mounting base are so disposed so that irrespective of whether the other end of the communication-connecting pipe is connectably inserted within either of said inlet or outlet port of said connecting pipe member then the bypassing flow of the fluid is introduced into a tapered line having a built-in float which is adapted to be moved by the bypassing flow of fluid into a position indicating the rate of flow of the fluid through the main line, whereupon said bypassing fluid is then passed through the return line of the meter to reenter the main line.

Fig. 4
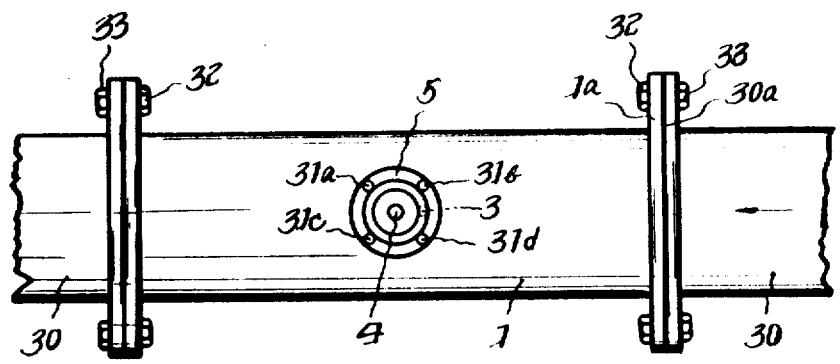
(a)
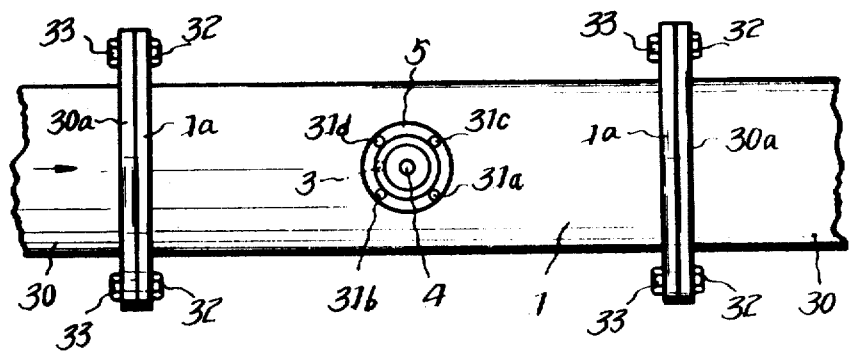
(b)

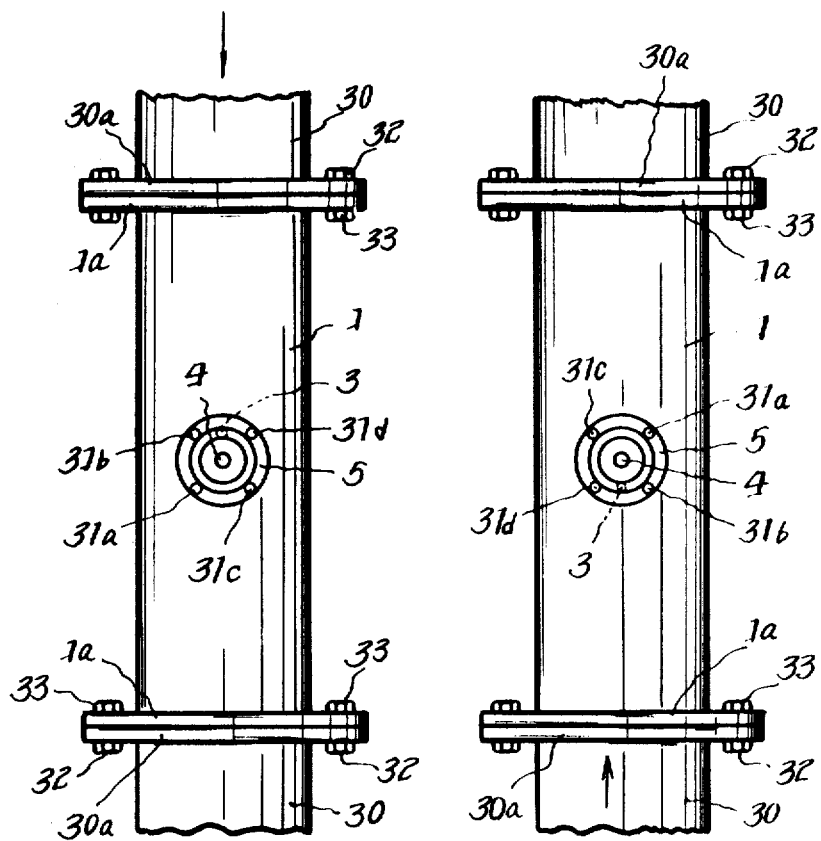

3,603,148

FLOW METER OF THE AREA TYPE

DESCRIPTION OF THE PRIOR ART

A flowmeter of the area-type permits determining the flow rate of a fluid in a main line by a change in the position of a float disposed within a tapered line of the flowmeter into which the fluid to be measured is introduced. Flowmeters of the prior art generally must be mounted on the main line in such a manner that the tapered line thereof is always disposed perpendicularly, and the flowmeters adapted to be mounted horizontally relative to the main line differ in construction from those to be arranged vertically.

Realization of advantages stemming from mass production of flowmeters of the area-type has hitherto been hampered by an inability to simplify the design of flowmeters of the area-type due to the fact that conventional area-type flow meters vary in construction depending on the manner of arrangement of the main line on which they are mounted.

SUMMARY OF THE INVENTION

The present invention relates to a flowmeter of the area-type. The present invention has as its object the provision of an improved and novel flowmeter of the area-type which can be mounted on any main line irrespective of the manner of arrangement thereof and irrespective of the direction of flow of a fluid passing therethrough, such flowmeter being adapted to be mounted on a main line arranged either vertically or horizontally.

In one aspect of the present invention, there is provided a flow meter of the area-type comprising a connecting pipe member having a disc fitted in the axial bore of said connecting pipe member, said disc being connected to the inner wall of the connecting pipe member with the upper face of the disc being disposed substantially normal to the direction of fluid flow through the connecting pipe member and formed with an orifice substantially in the center portion of the disc, said connecting pipe member being formed with a bypassing fluid flow inlet port disposed on the upstream side of the wall of the connecting pipe member with respect to the orifice in the connecting pipe member and with a bypassing fluid flow outlet port disposed on the downstream side of the wall of the connecting pipe member with respect to the orifice in the connecting pipe member; a mounting pipe member projecting from one side surface of said connecting pipe member and disposed perpendicularly with respect thereto with the center axis of said mounting pipe member being aligned with said bypassing fluid flow outlet port; a tapered line having a built-in float; a return line for introducing the bypassing fluid flow passing through said tapered line into said bypassing fluid flow outlet port formed in the connecting pipe member; and a mounting base supporting said return line and said tapered line and formed therein with a fluid flow inlet passageway and a fluid flow outlet passageway, said fluid flow inlet passageway connecting the fluid inlet end of said tapered line to said bypassing fluid flow inlet port disposed on the upstream side of the wall of the connecting pipe member with respect to the orifice in the connecting pipe member, and said fluid flow outlet passageway connecting said return line to said bypassing fluid flow outlet port disposed on the downstream side of the wall of the connecting pipe member with respect to the orifice in the connecting pipe member; said mounting base being removably fitted in and connected to said mounting pipe member on one side thereof in such a manner that the mounting base is adapted to be disposed in any one of the four positions as desired with respect to the mounting pipe member, and said mounting base having fixed thereto a communication line projecting from the center portion of the side surface of the mounting base on which the mounting base is removably fitted in and connected to the mounting pipe member and connected at one end to said fluid flow outlet passageway and at the other end to the bypassing fluid flow outlet port maintained in alignment with the center axis of the mounting pipe member.

In another aspect of the invention there is provided a flowmeter of the area-type comprising substantially the same components but differing in arrangement, toward the latter part of the aforesaid description, in that the communication line, which projects from the center portion of the side surface of said mounting base on which the mounting base is removably fitted in and connected to the mounting pipe member, is connected at one end to the said fluid flow inlet (instead of outlet) passageway and at the other end to the bypassing fluid flow inlet (instead of outlet) port maintained in alignment with the center axis of the mounting pipe member.

In the present invention, the flowmeter of the area type is connected to one side of the connecting pipe member of either a new or existing main line in such a manner that the tapered line of the meter is disposed vertically at all time irrespective of whether the connecting pipe member is arranged vertically or horizontally.

Other features and advantages of the present invention will become apparent from the description set forth hereinafter when considered in conjunction with the accompanying drawings.

BRIEF DESCRIPTION OF THE DRAWINGS

FIG. 4 is a schematic view of the flowmeter according to this invention which shows, with reference to the first embodiment of the invention, four different angular positions the connecting pipe member can assume with respect to the main line when the former is connected to the latter.

DESCRIPTION OF THE PREFERRED EMBODIMENTS preferred embodiment of the present invention will be explained with reference to the accompanying drawings wherein like reference numerals designate like parts throughout the several figures. FIG. 1 shows the flowmeter of the area-type according to this invention as it is mounted on the connecting pipe member being disposed vertically. The connecting pipe member 1 is adapted to be mounted on a main line (not shown) through which a fluid to be measured flows for connecting the flowmeter of the area-type to the main line. The connecting pipe member 1 is mounted on the main line such that a fluid flow is directed as shown by the arrow A. The connecting pipe member 1 has a disc fitted in the axial bore and connected to the inner wall of the connecting pipe member with the upper face of the disc being disposed substantially normal to the direction of fluid flow through the connecting pipe member. An orifice 2 is formed substantially in the center position of the disc. A bypassing fluid flow inlet port 3 is formed on the upstream side of the wall of the connecting pipe member 1 with respect to said orifice 2, and a bypassing fluid flow outlet port 4 is formed on the downstream side of the wall of the connecting pipe member 1 with respect to said orifice 2. The connecting pipe member 1 is formed with a flange 1a for mounting the connecting pipe member on the main line. A mounting pipe member 5 is provided for mounting the subject flowmeter on the connecting pipe member 1. The mounting pipe member 5 projects from one side of the connecting pipe member in such a manner that the center axis thereof is aligned with said bypassing fluid flow outlet port 4. The interior of the mounting pipe member 5 serves as an entrance 5a to a bypass. A mounting base 6 is formed at one side thereof with a mounting portion 7 which fits within said mounting pipe member 5. A transparent strainer supporting cylinder 9 supporting a strainer 8 is threadably connected to the lower portion of the mounting base 6. A return line 12 and a transparent tapered line 11 having a built-in float 10 therein are arranged vertically in side-by-side relationship and supported by the upper portion of the mounting base 6. Although not clearly seen in the figures, the tapered line is slightly tapered, or its diameter is reduced in going from the top to the bottom. The taper line construction and function thereof with the gauging float member is well known in the art, but reference may be made to U.S. Pat. No. 2,023,008, and more particularly to the latter part of column 2 and to column 3 thereof for a more detailed description of this general type of meter construction and operation. A bypassing flow outlet passageway 13 is formed in the mounting base 6 for connecting the center of portion 7 to the return line 12. This outlet passageway 13 is threadably connected at the other end to one end of a communication line 14 which has its other end inserted in said bypassing outlet port 4.

Figure 1:
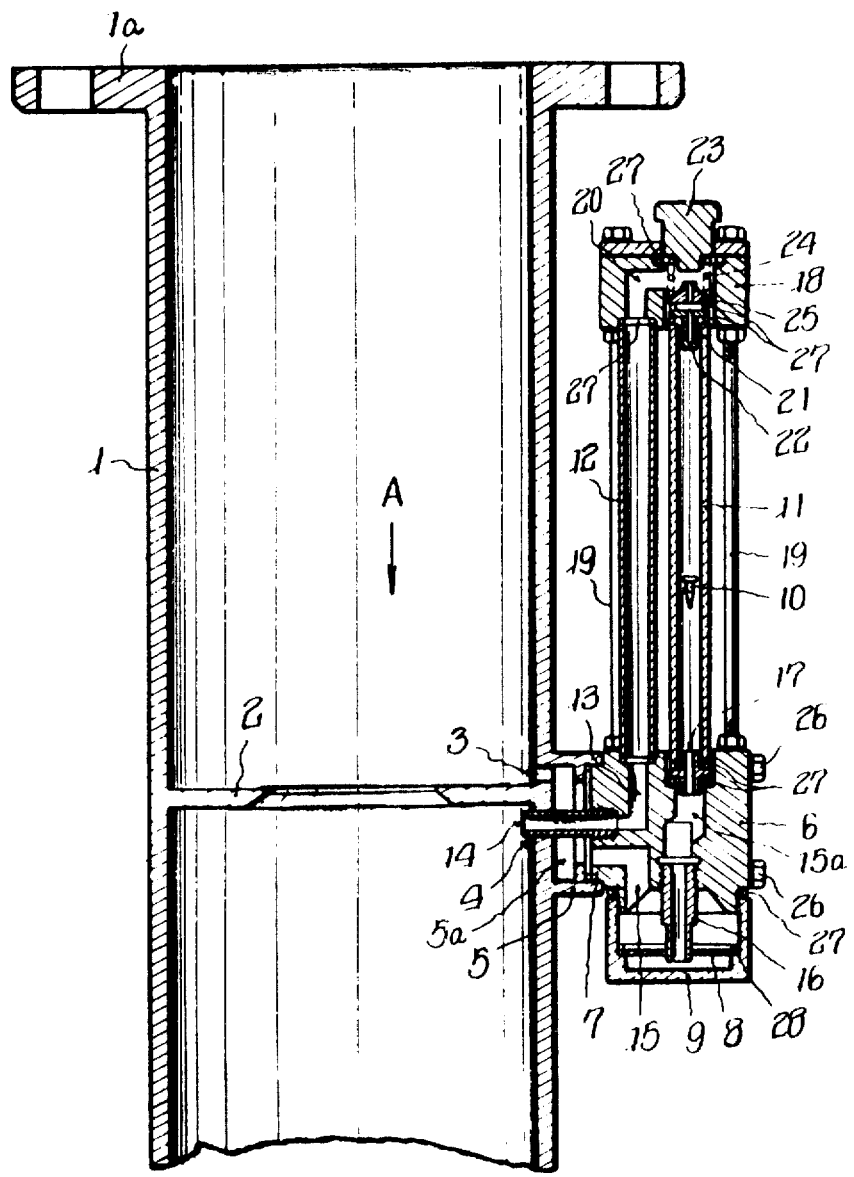
FIG. 1 is a longitudinal sectional view of one embodiment of the present invention showing the flowmeter as it is mounted on the connecting pipe member arranged vertically, with certain parts of the connecting pipe member being cut out.

There is a small clearance between the discharge port 4 and the outer wall surface of said communication line 14 so that leakage of fluid therethrough may occur while the fluid flow rate is being determined. The leakage is so small in amount that it is of no significance to the fluid flow introduced through the bypassing inlet port 3, exerting no influences on the pressure of fluid in the entrance 5a to the bypass. Accordingly, no errors are caused in the results obtained in determining a flow rate of the fluid.

A fluid inlet passageway 15 is also formed in the mounting base 6 and maintains communication between the bypassing inlet port 3 and the inlet side of the strainer 8. Another fluid inlet passageway 15a establishes and maintains communication between the outlet side of the strainer 8 and the lower end of the tapered line 11. Threadably connected to the lower end of said inlet passageway 15a is an inlet line 16 which penetrates and extends through the strainer 8. A stopper line 17 is interposed between the lower end of the tapered line 11 and the upper end of the fluid inlet passageway member 15a. The numeral 18 refers to a top support for supporting the tapered line 11 and the return line 12 at their upper ends which is connected to the mounting base 6 by a plurality of spaced connecting bolts or posts 19. The top support 18 is formed in the interior with a duct 20 maintaining communication between the upper end of each of tapered lines 11 and the return line 12. Interposed between the duct 20 and the upper end of the tapered line 11 is a stopper 22 formed with a small diameter bore 21 for determining the fluid flow rate. Said stopper 22 is held in position together with the tapered line 11, a screw 23 threadably connected in the support top 18 by means of a spring 24 and a spring retainer 25 preferably formed on stopper 22. By rotating and disconnecting the screw 23 from the top support 18, it is possible to readily remove the tapered line 11 from the mounting base 6 for cleaning or replacement.

The mounting base 6 is removably mounted on the mounting pipe member 5 as by bolts 26. It is possible to readily disconnect the mounting base 6 from the mounting pipe member 5 so that the former may be mounted on the latter in four different positions by merely manipulating the bolts 26. The numeral 28 refers to a packing for the strainer 8.

Figure 2:
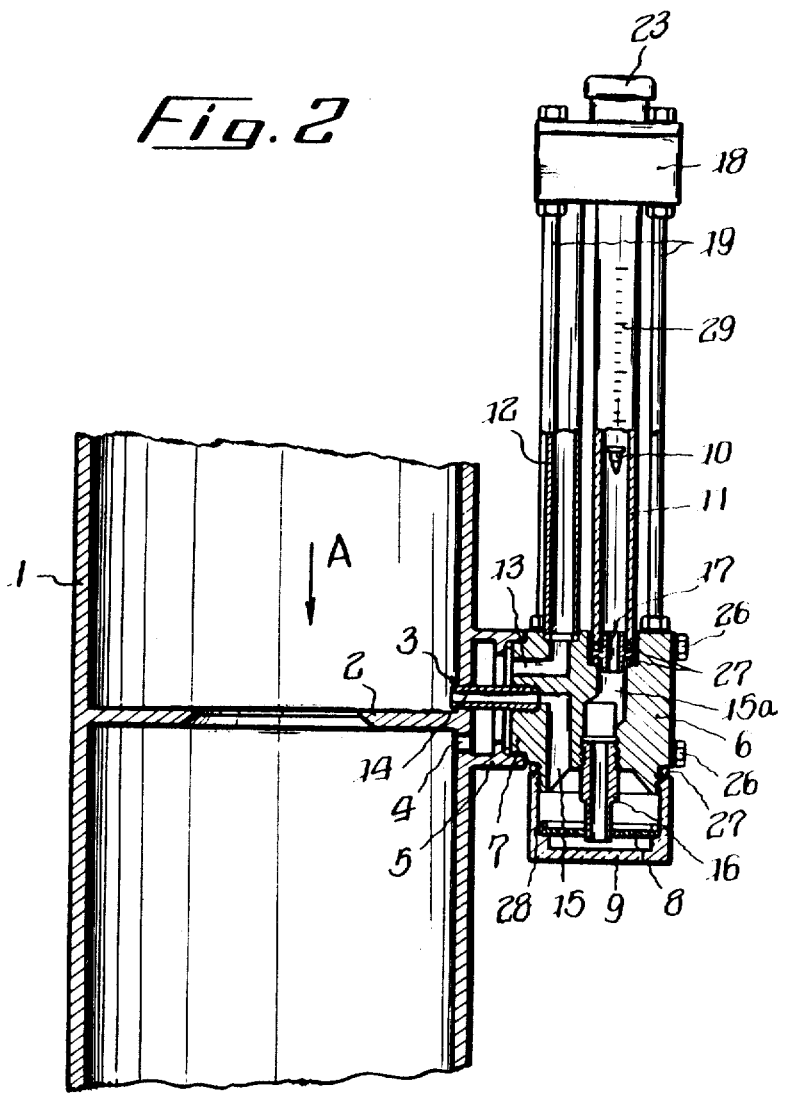
FIG. 2 is a similar side view of another embodiment of the present invention showing the flowmeter as it is mounted on the connecting pipe member arranged vertically, with essential portions of the flowmeter being shown in section, and other parts in elevation.

FIG. 2 shows another embodiment of the invention in which the mounting pipe member 5 for mounting the subject flowmeter on the connecting pipe member 1 is positioned such that its center axis is aligned with the bypassing inlet port 3, and not with the bypassing outlet port 4, as in the first embodiment. The communication line 14, threadably connected to the fluid flow inlet passageway 15 at one end is inserted in said inlet port 3 at the other end, and coaxially aligned with the center axis of the mounting pipe member 5. Other details of the construction of the second embodiment are similar to those of the first embodiment, and their description is omitted in the interest of brevity. In FIG. 2, the numeral 29 refers to a scale for indicating the position of the float 10 which is marked on the surface of the tapered line 11.

Figure 3:
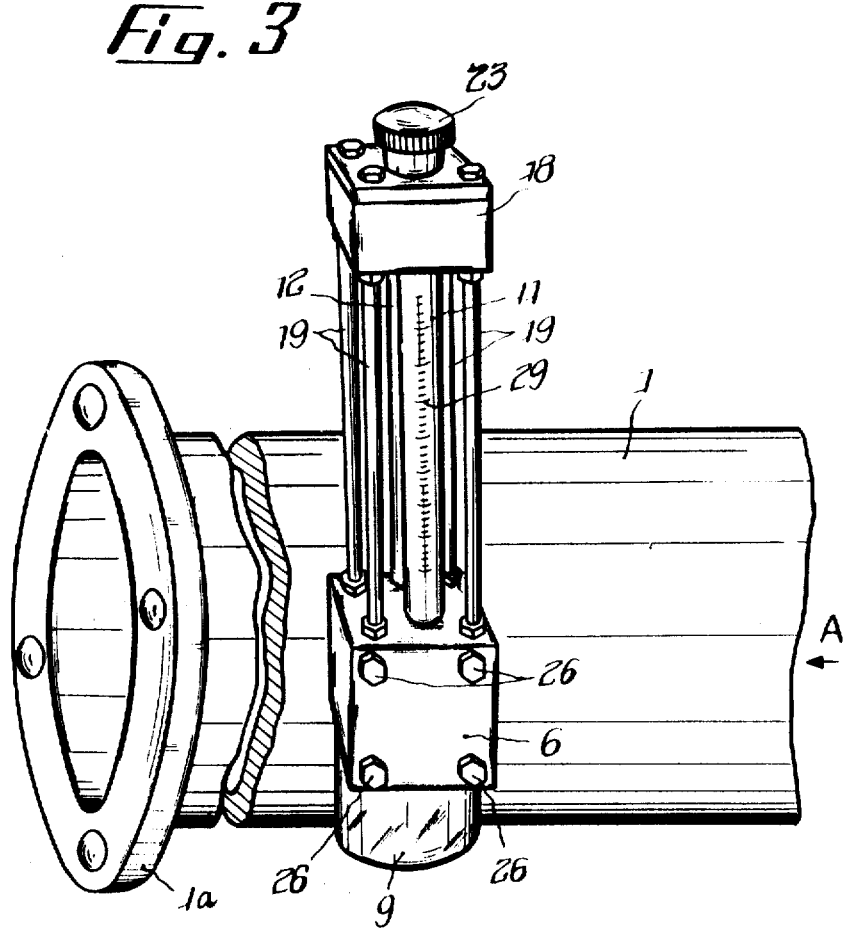
FIG. 3 is a perspective view of the flowmeter according to this invention shown mounted on the connecting pipe member which is arranged horizontally.

FIG. 3 is a perspective view of the subject-type flowmeter which is mounted in such a manner that the connecting pipe member 1 is arranged horizontally. The first and second embodiments can both be mounted in this position. When a main line (not shown) to which the subject flowmeter is to be connected is arranged horizontally, the connecting pipe member 1 is connected to the main line in conformity with the direction of flow through the main line so that a fluid may flow through said connecting pipe member 1 in the direction of arrow A. The manner of mounting the flowmeter on the connecting pipe member disposed in this position will be explained with reference to FIGS. 1 and 2. The portion 7 on one side of the mounting base 6 has a necklike projection which is fitted into the collarlike portion of the mounting pipe member 5, and then the communication line 14, connected at one end to the fluid flow outlet passage 13, is inserted at the other end into the bypassing fluid flow outlet port 4 in the case of the first embodiment. In the case of the second embodiment, the communication line 14, threadably connected to the fluid flow inlet passageway 15 at one end, is inserted into the fluid flow inlet port 3 at the other end. Then, the mounting base 6 is pivoted about the communication line 14 to bring it to a suitable position. When the mounting base 6 is correctly positioned with respect to the connecting pipe member 1, the mounting base 6 is clamped to the mounting pipe member 5 by the bolts 26.

The subject flowmeter can be mounted on the connecting pipe member arranged vertically in the same manner as described above.

FIG. 4 is a schematic view of the flowmeter according to this invention which shows, with reference to the first embodiment of the invention, four different angular positions the connecting pipe member can assume with respect to the main line when the former is connected to the latter. Since the connecting pipe member 1 must be connected to the main line 30 such that the fluid flow is directed from the upstream side to the downstream side of the orifice, it will be understood from the figure that the connecting pipe member 1 can assume any of the four angular positions (a), (b), (c) and (d) when it is connected to the main line 30 depending on the direction of the flow of fluid in the main line indicated by arrows and whether the main line is disposed horizontally or vertically. The connecting pipe member 1 can be connected to the main line 30 by fixing flanges 30a of the main line 30 to flanges 1a of the connecting pipe member 1 by bolts 32 and nuts 33. The mounting base 6 shown in FIG. 1 can be connected to the mounting pipe member 5 such that the former can be angularly displaced into four different directions with respect to the latter. More specifically, the mounting base 6 can be connected to the mounting pipe member 5 in such a manner that it can be angularly displaced into four different angular positions by turning it through 90° about the communication line 14 which is inserted in the outlet port 4 or the mounting base 6 can be directed upwardly, downwardly, rightwardly or leftwardly with respect to the mounting pipe member 5 when it is connected thereto. It will thus be appreciated that the mounting base 6 can be connected to the mounting pipe member 5 and fixed thereto by the bolts 26 in such a manner that the tapered line 11 is disposed vertically at all times irrespective of the angular position in which the connecting pipe member is connected to the main line or when the connecting pipe member 1 is connected to the main line 30 in any one of the four different angular positions (a), (b), (c) and (d). In FIG. 4, 31a, 31b, 31c and 31d are female screws for the bolts 26. When the mounting base 6 is connected to the mounting pipe member 5, each bolt 26 is threaded into one of the female screws 31a, 31b, 31c and 31d so as to fix the mounting base 6 to the mounting pipe member 5.

It will be understood that in the second embodiment of the invention shown in FIG. 2 the connecting pipe member can also be connected to the main line in four different angular positions as is the case with the connecting pipe member of the first embodiment of the invention just described.

By virtue of the construction shown in FIGS. 1 and 2 and described hereinabove, this area-type flowmeter can determine the flow rate of a fluid flowing through a main line. The operation of the invention will now be explained with reference to both the first and second embodiments.

The presence of the orifice 2 formed in the disc connected to the inner wall of the connecting pipe member 1 with the upper face of the disc being disposed substantially normal to the direction of fluid flow causes a pressure differential in the fluid to occur between the upstream side and the downstream side of the connecting pipe member with respect to the orifice in accordance with the fluid flow rate in the connecting pipe member 1, and hence in the main line. This pressure differential in the fluid flow causes a quantity of fluid to be introduced through the bypassing fluid flow inlet port 3 into the bypass made up of the fluid flow inlet passageway members 15 and 15a, tapered line 11, return line 12, and discharge passageway 13 in the flowmeter to be discharged through the bypassing outlet port 4. The float 10 in the tapered line 11 moves upwardly and downwardly in conformity with variations in the flow rate of the bypassing fluid passing through the tapered line 11 to indicate the flow rate on the scale 29. By reading the position of the float 10 in the tapered line 11, it is possible to determine the flow rate of the fluid passing through the main line.

The fluid passing through said bypass is filtered by the strainer 8 so that foreign matter can be removed from the fluid. This prevents obturation of the small diameter bore 21 of the stopper 22 mounted in the upper part of tapered line 11 by foreign matter, making it possible to effect accurate determination of flow rate. The readily removable strainer 8 can be seen from outside through transparent cap 9, so that cleaning of the strainer 8 is facilitated. Also, the tapered line 11 can readily be removed from the mounting base 6 for cleaning or replacement by disconnecting the screw 23.

From the foregoing description, it will be appreciated that the flowmeter of the area type according to this invention is constructed such that the communication line 14 projecting from the center of portion 7 of the mounting base 6 is inserted at its forward end either in the bypassing outlet port 4 or the bypassing inlet port 3, as aligned with the center axis of the mounting pipe member 5. This arrangement permits moving the flowmeter in pivotal motion about the communication line 4 to mount the flowmeter on the mounting pipe member 5 in any position as desired by means of the bolts 26. Stated differently, this arrangement permits mounting the subject-type flowmeter on a main line so that the flowmeter may be disposed perpendicularly at all times, regardless of the direction in which the main line is arranged or the direction in which the fluid to be measured flows.

It is apparent that a novel area-type flowmeter has been evolved which is simple in design, can be mass produced at low cost, and achieves the objects and advantages as set forth in the preamble and throughout the specification.

What is claimed is:

1. A flowmeter of the area type comprising in combination:
   a. a connection pipe member for connecting the meter to a main line through which flows a fluid to be measured, said connecting pipe member having an orificed disc disposed within the axial bore of said connecting pipe member and being disposed substantially normal to the direction of fluid flow through the connecting pipe member;
   b. said connecting pipe member being formed with a fluid bypassing inlet port disposed on the upstream side of the wall of said connecting pipe member with respect to said orifice, and further formed with a fluid bypassing outlet port disposed on the downstream side thereof;
   c. an annular meter-mounting pipe member or collar projecting substantially perpendicularly from one side of said connecting pipe member and disposed in coaxial alignment with one of said bypassing ports;
   d. a pair of fluid flowmeter lines, one of which constitutes a tapered fluid feed gauge line to receive bypassing fluid flow in one end to operatively move a float member therein relative to float indicator indicia provided on said tapered line, and then passes out an opposite fluid exit end; and the other line constituting a fluid flow return line for operatively directing the bypass fluid flow leaving said tapered line to said bypassing outlet port in said connecting pipe member for returning said fluid flow to said main line;
   e. lower and upper mounting base and cap means for operatively connecting said pair of lines together, said base means including means for mounting same for rotative adjustment to said mounting pipe collar of paragraph (c) to facilitate any of four predetermined angular mounting positions of the gauge meter line with respect to said mounting pipe member and said main line;
   f. said lower base means for mounting said tapered and return lines including a mounting base having neck portion for cooperable sealing engagement with said mounting collar, and further having a side surface transversely disposed within said collar; aid lower base having both inlet and return passageways communicating with and via ports formed in said side surface and operatively connecting said tapered feed gauge and return lines respectively with said bypass inlet and outlet ports of said connecting pipe member of paragraph (b), one of said latter passageway ports being disposed centrally in said side surface; and
   g. a communication pipe line with means for removably affixing a first end to and the other end projecting from that one of the inlet and return passageway ports formed in said lower base means which is coaxially aligned with said mounting collar of paragraph (c), and with said projecting end operatively connected with the corresponding coaxially aligned inlet or outlet port in said mounting collar of the connecting pipe member.

2. A flowmeter as defined in claim 1 wherein said mounting collar of paragraph (c) is disposed coaxially with said bypassing outlet port of said connecting pipe member; said outlet port of said lower base means as per paragraph (f) being the one disposed centrally in said side surface thereof; and said communication pipe line of paragraph (g) having the first end thereof connected to said centrally disposed outlet port of said side surface, and having the projecting end connected with said coaxially aligned bypassing outlet port of said connecting pipe member.

3. A flowmeter as defined in claim 1 wherein said mounting collar of paragraph (c) is disposed coaxially with said bypassing inlet port of said connecting pipe member; said inlet port of said lower base means as per paragraph (f) being the one disposed centrally in said side surface thereof; and said communication pipe line of paragraph (g) having the first end thereof connected to said centrally disposed inlet port of said side surface, and having the projecting end connected with said coaxially aligned bypassing inlet port of said connecting pipe member.

4. A flowmeter as defined in claim 1 wherein the means of paragraph (d) for adjustably mounting said lower base means and the meter lines thereof for rotative adjustment to said mounting collar of paragraph (c) include a plurality of circumferentially spaced, complementary bolts and bolt receiving openings in said lower base means and in said mounting collar; said bolt spacings being of a predetermined setting to facilitate selectively mounting of said lower base means and meter lines so the gauge line thereof can be maintained in a substantially vertical condition at all times irrespective of angular disposition of said connecting pipe member and said main line.

5. A flowmeter as defined in claim 1 wherein said upper cap means is disposed opposite said lower base means and having seal means for mounting the tapered and return lines therebetween, said upper cap having a passageway interjoining said lines; means in said top and lower base means for removably mounting said taper line; removably filter means in said lower base to filter out impurities to preclude potential clogging of said taper line during operation of said flow meter, and wherein said taper line is a transparent tube having the predetermined scale indicia thereon, and the built-in float member within said taper line is adapted to be moved by flow of fluid passing there through and to be read to give a flow reading when viewed in comparison to said scale indicia.